United States Patent
Zbiral et al.

(10) Patent No.: US 11,245,156 B2
(45) Date of Patent: Feb. 8, 2022

(54) DEGASSING UNIT AND ELECTRONICS HOUSING, IN PARTICULAR BATTERY HOUSING

(71) Applicant: MANN+HUMMEL GmbH, Ludwigsburg (DE)

(72) Inventors: Robert Zbiral, Marbach (DE); Peter Muench, Tamm (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 92 days.

(21) Appl. No.: 15/930,500

(22) Filed: May 13, 2020

(65) Prior Publication Data
US 2020/0388807 A1    Dec. 10, 2020

(30) Foreign Application Priority Data
May 13, 2019   (DE) .................... 10 2019 112 432.8

(51) Int. Cl.
*H01M 50/30*       (2021.01)
(52) U.S. Cl.
CPC ...... *H01M 50/394* (2021.01); *H01M 2220/20* (2013.01)

(58) Field of Classification Search
None
See application file for complete search history.

(56) References Cited

FOREIGN PATENT DOCUMENTS

DE    102012022346 A1    5/2014

*Primary Examiner* — Wyatt P McConnell

(57) ABSTRACT

A degassing unit for an electronics housing has a base body to be connected fluid-tightly to a rim of a pressure compensation opening of the electronics housing. The base body has a gas passage opening covered by a semipermeable membrane that enables passage of gaseous media but prevents passage of liquid and solids. A fluid-permeable protective screen with screen openings is arranged at an inner side of the base body across the gas passage opening. The base body has a thread engagement region for screw-connecting the degassing unit to the electronics housing. The protective screen has a screw through opening aligned with the thread engagement region of the base body. At the screw through opening, a thread engagement region of the protective screen is provided that fixes the protective screen by a threaded fastening element immediately relative to the electronics housing in a mounted state of the degassing unit.

26 Claims, 5 Drawing Sheets

DEGASSING UNIT AND ELECTRONICS HOUSING, IN PARTICULAR BATTERY HOUSING

CROSS-REFERENCE TO RELATED APPLICATION

This application claims the benefit of prior filed German patent application No. 10 2019 112 432.8, filed 13 May 2019, the entire contents of the aforesaid German patent application being incorporated herein by reference to the fullest extent permitted by the law.

TECHNICAL FIELD

The invention concerns a degassing unit and an electronics housing, in particular a battery housing, in particular of a traction battery of a motor vehicle.

BACKGROUND OF THE INVENTION

Housings for receiving electronic components such as, for example, battery cells and the like cannot be closed off completely to the environment so as to be gas-tight because, on the one hand, due to temperature fluctuations (for example, due to heat introduction by charging or discharging battery cells) and, on the other hand, due to naturally occurring air pressure fluctuations, in particular in mobile systems, a gas exchange between the interior space and the exterior space must be enabled in order to prevent impermissible mechanical loads of the housing, in particular bursting or bulging of the housing. It is however likewise important that the ingress of foreign matter, dirt, and moisture is prevented effectively.

Therefore, pressure compensation devices are known that comprise semipermeable membranes which are gas-permeable but liquid-impermeable.

When within the housing a pressure peak is produced, for example, when a battery cell fails in a battery housing, this pressure must be relieved as quickly as possible because otherwise the housing might become damaged.

As a simplest embodiment of a burst protection, it is known, for example, in case of lead batteries, to employ burst plates in the sense of a "rated break point", in particular made of a metallic sheet material, or safety flaps or valves which are inserted into a housing opening.

In case of high-voltage batteries, in particular lithium-based traction batteries with significantly higher storage capacities and power densities, highly specific pressure compensation devices are used instead which are optimized for fulfilling the aforementioned tasks.

DE 10 2012 022 346 B4 discloses a degassing unit for a battery housing which comprises a base body which comprises a gas outlet opening which is covered by a semipermeable membrane that is permeable for gases but impermeable for liquids, wherein the membrane is stationarily and fluid-tightly connected to the base body, in particular welded thereto. The base body is fluid-tightly connectable to a pressure compensation opening of the battery housing. A gas exchange in the normal operation is ensured by the membrane by its semipermeable properties while, for realization of an emergency degassing function, an emergency degassing spike, facing toward the membrane, is arranged at a cover body, which perforates and ruptures the membrane upon surpassing a limit expansion which is induced by a housing inner pressure so that a sudden pressure compensation from the interior to the environment is possible. At an inner side which is facing in the mounted state the battery housing, an inner protective screen is connected to the base body and is to prevent ingress of foreign bodies into the battery housing. The inner protective screen is connected by hot stamping connections to the base body, preferably comprised of plastic material, and comprises through openings for screw-connecting the base body to the battery housing, wherein the base body for engagement of screws used for the screw connection comprises threads that are formed by metallic thread inserts.

The degassing units known in the prior art have the disadvantage that their fire protection function is realized by technically complex and expensive measures. Fire protection function is to be understood in the context of the present application as a safety functionality which ensures that the (inner) protective screen mentioned above, even after strong thermal impact (fire, cell defect, thermal runaway) in which in the worst case the (plastic) base body can be completely thermally destroyed, remains attached stationarily relative to the battery housing, i.e., its protective function is maintained even after the thermal impact.

SUMMARY OF THE INVENTION

Object of the present invention is therefore to provide a degassing unit for an electronics housing, in particular for a battery, in particular for a traction battery of a motor vehicle, distinguished in that it comprises a technically simple and cost-efficient fire protection function.

This object is solved by a degassing unit for an electronics housing with a base body connectable fluid-tightly to a rim of a pressure compensation opening of the electronics housing and comprising at least one gas passage opening which is covered by a semipermeable membrane which enables passage of gaseous media from an environment into the electronics housing and vice versa, but prevents passage of liquid media and/or solids, and with a fluid-permeable protective screen with a plurality of screen openings, which is arranged at an inner side of the base body and which at least partially engages across the gas passage opening, wherein the base body comprises at least one thread engagement region which is configured for screw-connecting the degassing unit to the electronics housing, and wherein the protective screen comprises at least one screw through opening which is present substantially aligned with the thread engagement region of the base body, wherein the degassing unit is characterized in that, in the region of the screw through opening of the protective screen, a thread engagement region is present that is configured to fix the protective screen by means of a threaded fastening element immediately relative to the electronics housing in a mounted state of the degassing unit.

The object is further solved by an electronics housing, in particular battery housing, in particular of a traction battery of a motor vehicle, that comprises at least one housing wall with a pressure compensation opening, wherein in the electronics housing preferably battery cells can be arranged, wherein the pressure compensation opening is closed by a degassing unit as disclosed and claimed.

Preferred further embodiments of the invention are described in the dependent claims.

Advantages of the invention result from the description and the drawings. Likewise, the aforementioned and still further explained features can be used according to the invention each individually or a plurality thereof in any combinations. The illustrated and described embodiments are not to be understood as a final listing but have instead an exemplary character for describing the invention.

According to the present invention, the term degassing unit has been selected for the device according to the invention. It is however understood that the device according to the invention enables likewise venting of an interior of the electronics housing through the (porous) semipermeable membrane and therefore the device according to the invention can also be referred to as "pressure compensation unit" or "venting unit".

The herein employed relative designations "inner" and "outer" refer to a mounted state relative to the electronics housing, wherein "inner" means facing the electronics housing and "outer" facing the environment.

According to a first embodiment of the degassing unit for an electronics housing, in particular for a battery, in particular for a traction battery of a motor vehicle, the degassing unit comprises a base body which is connectable fluid-tightly with a rim of a pressure compensation opening of the electronics housing and comprises at least one gas passage opening that is covered by a semipermeable membrane. The semipermeable membrane enables a passage of gaseous media from an environment into the electronics housing and vice versa, but prevents the passage of liquid media and solids. Moreover, the degassing unit comprises a protective screen with a plurality of screen openings; the protective screen is arranged at an inner side of the base body and at least partially engages across the gas passage opening. The base body comprises at least one thread engagement region which is configured for screw-connecting the degassing unit with the electronics housing, in particular at the inner side of the base body.

The protective screen comprises at least one screw through opening which is substantially aligned with the thread engagement region of the base body. Finally, it is provided according to the invention that in the region of the screw through opening of the protective screen a thread engagement region is embodied which is designed to fix the protective screen by means of a threaded fastening element directly relative to the electronics housing in a mounted state of the degassing unit.

In a preferred embodiment, the semipermeable membrane is positioned at the inner side of the base body and is at least partially engaged from behind by the protective screen.

A contact or connection of the semipermeable membrane with the inner side of the base body has the advantage that the semipermeable membrane is held by inner pressure action essentially with form fit relative to the base body and the connection (weld connection, glue connection or the like) is not loaded by tensile force, which can be important in particular when using PTFE materials that are difficult to join anyway. In order to also prevent upon inner pressure action an impermissibly strong bending or "bulging" of the semipermeable membrane, which could lead to its destruction, the base body can additionally comprise a membrane outer protective screen which spans across the membrane surface externally at least partially but is fluid-permeable with a sufficiently large surface proportion in order to enable the gas exchange in normal operation.

Preferably, the fluid-permeable inner protective screen covers the gas passage opening completely across the entire surface area. The protective screen serves as ingress protection relative to an interior of the electronics housing so that objects such as, for example, screwdrivers or the like cannot reach the interior. This is in particular important because traction batteries for vehicles are frequently operated in the high-voltage range and thereby pose dangers. The protective screen can comprise a plurality of spaced-apart screen webs whose minimum spacing is to be selected such that an ingress can be safely prevented. The screen webs can be arranged in a rectangular pattern or as a combination of circumferentially extending and radially extending screen webs.

The protective screen can preferably comprise a metal or a plastic material or consist thereof, preferably polypropylene and/or polybutylene terephthalate, each preferably comprising reinforcement fibers, in particular glass fibers.

A protective screen of metal has the important advantage that even after a high-temperature impact the protective function is maintained for which reason it is used preferably according to the present invention.

The base body can be comprised substantially of plastic material, in particular thermoplastic plastic material and in particular can be injection-molded. Preferred materials are polypropylene, polybutylene terephthalate or polyamide, each comprising reinforcement fibers, in particular glass fibers.

For the semipermeable membrane, all materials can be used which have a gas permeability for venting in normal operation and a sufficiently high water impermeability. Polytetrafluoroethylene (PTFE) can be employed as preferred material for the semipermeable membrane. The semipermeable membrane comprises an average pore size that may lie between 0.01 micrometer and 20 micrometer. The porosity is preferably approximately 50%; the average pore size amounts to preferably approximately 10 micrometer.

The semipermeable membrane can be preferably designed as a film-like or film-shaped or disk-shaped thin membrane. The gas-permeable membrane comprises a membrane surface which is effective for gas permeation and can comprise preferably a rectangular or round outer contour at its outer circumference. It is understood however that the outer circumference of the semipermeable membrane can also be differently designed. The semipermeable membrane is preferably a thin flat membrane whose membrane surfaces, which are effective for gas passage and face away from each other, are substantially parallel to each other and preferably are essentially configured planar.

The membrane thickness of the semipermeable membrane is very much smaller than its other outer dimensions. The semipermeable membrane can span across a minimum width and/or a minimum length or a minimum outer diameter of equal to or greater than 20 mm, preferably of equal to or greater than 30 mm, in particular of equal to or greater than 40 mm. The membrane thickness can be in particular at least 20 times, preferably at least 40 times, in particular at least 100 times, smaller than the minimum width and/or the minimum length or the minimum outer diameter of the semipermeable membrane. The membrane thickness can amount to 1 micrometer to 5 millimeter, wherein a membrane thickness of 0.1 to 2 mm, in particular 0.15 to 0.5 mm, is preferred.

Since according to the invention the protective screen is provided with its own thread engagement region, it is possible, in contrast to the prior art, to achieve an immediate connection or fixation of the protective screen relative to the electronics housing. This has the decisive advantage that in this way a fire protection function can be realized in an extremely simple and cost-efficient way. Even when the base body of the degassing unit is completely destroyed by thermal impact (fire, cell defect, thermal runaway or the like), which, in case of a construction of plastic material, may happen in the worst case in the sense of melting or at least softening of the base body material, the protective screen itself due to the direct connection relative to the electronics housing remains fixed and can continue to provide its safety function even after the thermal impact. In degassing units according to the prior art, this has been achieved also for base bodies of plastic material but in a significantly more complex way, namely in that in the base body separate thread inserts of metal have been provided that have a higher thermal load capacity than the base member itself. This is associated with an increased technical complexity (number of components, processing expenditure for the thread inserts, mounting expenditure) and is therefore expensive. These disadvantages are avoided by the present invention for which reason the degassing unit according to the invention provides an extremely simple and cost-efficient solution.

For ensuring an optimal sealing action at the interface base body/battery housing, the degassing unit according to the invention can have a housing seal, for example, in the form of an O-ring or a shaped seal, which in the mounted state can be compressed axially relative to a housing outer wall or radially in the pressure compensation opening of the battery housing.

According to a preferred embodiment, the threaded engagement region of the base body can have a bore, in particular a blind bore that is open at least toward the inner side of the base body so that a threaded fastening element can be inserted into it, in particular screwable into it. In particular, the thread engagement region is embodied directly or immediately in a base body material; this is possible advantageously especially in embodiments with plastic base bodies in that self-tapping screws are used for attachment of the base body relative to the electronics housing; the self-tapping screws on their part are capable themselves of tapping or cutting a counter thread into the thread engagement region of the base body. Herein, the term "bore" is to be understood broadly and not in the narrow sense as a cutout of cylindrical contour that has been produced by machine-cutting. The term bore instead encompasses any cutouts with cylindrical or other shape that are open at least at one side and are capable of enabling a thread engagement as described above.

In an even more preferred embodiment, the thread engagement region of the base body is embodied to be free of metal. Free of metal means in particular that the thread engagement region of the base body comprises no separate thread inserts or thread bushings of metal. In this way, the manufacture of the degassing unit according to the invention is further simplified and the costs are lowered. Accordingly, the base body, when it is comprised of plastic material which is preferred, can be obtained by a single-stage injection molding process as a finished part; advantageously, no further post-processing, mounting step or the like is required as is still the case in the prior art due to mounting of the thread inserts.

In yet a further, also preferred embodiment it can be provided that the protective screen is configured as a sheet metal part, in particular stamped sheet metal part.

In this way, a still further simplified and cost-optimized manufacture is enabled because in particular the thread engagement region of the protective screen can be embodied as one piece together with the protective screen. In a special embodiment, the thread engagement region of the protective screen can be embodied as an engagement section which is projecting radially into the screw through opening of the protective screen and in particular is provided with at least one engagement tab that is designed to produce in the mounted state a form-fit functional contact with the threaded fastening element.

According to this embodiment, the thread engagement region of the protective screen is enabled by an engagement section of the protective screen that can be compared to a sheet metal nut. The engagement section or the one or plurality of engagement tab(s) can be embodied in particular such that they are embodied correspondingly with a predetermined thread pitch (axial displacement relative to circumferentially neighboring engagement tabs) in order to enable a friction-reduced assembly and at the same time a safe attachment.

Advantageously, such an afore described "sheet metal nut-type" engagement section with one or a plurality of engagement tab(s) can be produced in a single process step by means of stamping.

In an alternative embodiment the thread engagement region of the protective screen can also be provided by a conventional nut which can be, for example, welded to a protective screen body.

According to a further embodiment, the protective screen can be at least fixed relative to the base body so that the degassing unit can be mounted at the electronics housing with only one mounting step. This fixation does not serve for transmitting operational forces but is to be understood primarily as a pre-fixation for mounting reasons. This fixation can be realized in principle by means of any fastening means. For example, the protective screen can be glued, welded, screwed, clipped and/or riveted to the base body.

According to a particularly preferred embodiment, the protective screen for fixation relative to the base body can comprise at least one securing tongue which is projecting in the direction toward the base body and is received in a corresponding securing opening of the base body. In particular, the securing tongue is pressed into the securing opening. Alternatively or additionally, the securing tongue can also be thermally connected to a base body material wherein the securing opening in the base body corresponding with the securing tongue is produced by pressing the heated tongue against a base body surface with embedding of the tongue in the base body material. Expediently, the temperature to which the tongue is heated is matched to a melting and/or softening temperature of the base body material and lies above. Preferably, the base body material comprises a thermoplastic plastic material or consist thereof. The pressing action into the base body material can however also be carried out without thermal action, i.e., in that the securing tongue(s) is pressed in, for example, at approximately room temperature. This is possible for a suitable mutual material selection for the base body and the protective screen. The securing tongue provides in the securing opening an in particular frictional engagement that is sufficient for transmitting the aforementioned mounting forces. Alternatively or in addition, the securing tongue can also produce with the securing opening a form-fit engagement, for example, in the sense of a clip connection.

Preferably, the securing tongue of the base body can comprise a toothing in order to enable an at least partially frictional engagement in the securing opening of the base body. Depending on the sizing of the mutual dimensions, securing opening on the one hand and securing tongue or toothing on the other hand, it may be necessary to press in the protective screen with the securing tongues for assembly. Advantageously, comparatively great forces can be transmitted by the toothing, in particular when essentially a press fit is provided relative to the securing opening.

In a further preferred embodiment, the at least one securing tongue can be provided as a part of at least one bulge with a predetermined diameter which is provided at the protective screen. The bulge can advantageously be provided as a deep-drawn element at the protective screen wherein a simple deep-drawing tool, in particular a deep-drawing mandrel, is sufficient in order to generate the bulge. By means of the bulge, in a particularly simple and inexpensive way a connecting element for connecting the protective screen with the base body can be provided. Preferably, the bulge, as described above, is pressed into the base body material. This can be done at room temperature or with heating, wherein the bulge is embedded at least partially in the base body by softening or melting of the base body material.

In this context, the bulge can be substantially provided in the form of a spherical cap or a cupola wherein the at least one securing tongue is formed by at least one slot in the bulge and the bulge comprises a central through opening. In an advantageous embodiment, the bulge can also have two, three, four, or even more slots which are present distributed about a circumference of the bulge. In this way, for each bulge a plurality of tongues is provided, which increases the transmittable forces. The through opening as well as the slots can be produced in particular with a stamping tool prior to, after or during the aforementioned deep-drawing step for forming the bulge.

Moreover, in a further embodiment, a plurality of thread engagement regions of the base body surrounding the gas passage opening and respectively correlated screw through openings of the protective screen with thread engagement regions can be provided which are preferably positioned at regular angular spacings relative to each other. In this way, the protective screen relative to the electronics housing can be fixed even more reliably as compared to providing only a single pair of corresponding thread engagement regions of the base body and of the protective screen.

According to a further also preferred embodiment, it can be provided that the semipermeable membrane is connected circumferentially to a rim of the gas passage opening of the base body, in particular by welding. Alternatively, the semipermeable membrane can also be glued on or secured by frictional connection, for example, by being clamped. The porous PTFE membrane materials which have been described herein as preferred can be connected to a plastic base body with a corresponding pretreatment of a base body surface by mechanical roughing and/or plasma treatment and/or laser treatment without problem or can be connected in another way by material fusion.

Moreover, the degassing unit can have a cover which is connected to the base body wherein this cover preferably comprises at least one venting opening. The cover ensures that the semipermeable membrane cannot become damaged from the exterior either by foreign bodies, for example, pointed objects such as screwdrivers or the like, or by means of high-pressure cleaners and/or steam cleaners and thus contributes effectively to a high IP rating.

A further also preferred embodiment provides that the cover is fastened by means of a locking element engagement to the base body. The locking element engagement can be realized in this context, for example, at the outer circumference of the base body or at the end face at the outer side in a broader sense. For attachment of the cover at the base body, other fastening means are however also conceivable, for example, form-fit or frictional fasting means, for example, screws or clips, but also material fusion connections, in particular by (friction) welding.

As materials for the base body and/or the cover, in particular plastic materials are conceivable, preferably thermoplastic plastic material that can be processed by injection molding. Preferably, the base body and/or the cover is comprised of polypropylene, polybutylene terephthalate or polyamide, each optionally comprising reinforcement fibers, in particular glass fibers, or at least comprises at least one of these materials.

Alternatively or additionally, the degassing unit can comprise a housing seal which circumferentially surrounds the gas passage opening of the base body at its inner side. The housing seal can be configured as an axial or radial seal, i.e., in particular can be present at an end face (in case of the axial seal) or at a wall surface (in case of the radial seal). The housing seal can be embodied as an O-ring which is received in a corresponding groove of the base body or as an integral injection-molded sealing component. An arrangement of the housing seal in axial configuration is preferred wherein, particularly preferred, the housing seal surrounds a bayonet connecting means which in particular projects axially. The housing seal can be embodied in particular also as a shaped seal with a non-circular cross section, in particular stretched in longitudinal direction.

A further aspect of the invention concerns an electronics housing, in particular a battery housing, in particular of a traction battery of a motor vehicle. As further possibilities of use of the degassing unit according to the invention aside from traction batteries, there are also electrical cabinets or transformer housings. The electronics housing has at least one housing wall with a pressure compensation opening wherein preferably battery cells can be arranged in the electronics housing and wherein the pressure compensation opening is closed by a degassing unit according to the invention so that a gas exchange between an interior of the electronics housing and the environment is possible but ingress of moisture, dirt, and foreign bodies is effectively prevented.

In particular, in this context mounting of the degassing unit is provided such that it is connected from an interior of the electronics housing by means of at least one threaded fastening element, in particular a self-tapping screw, to a wall of the electronics housing wherein the threaded fastening element is directly in engagement with the thread engagement region of the protective screen. In addition to the engagement of the threaded fastening element at the thread engagement region of the protective screen which, as described above, is primarily important for the fire protection function in case of malfunctions of the battery system, the threaded fastening element for fluid-tight screw connection of the degassing unit with the electronics housing is also connected in a suitable way to the thread engagement region of the base body, wherein through the latter connection also the sealing pretension forces required for compressing the housing seal are introduced. Of course, also embodiments of the invention are encompassed in which the screw connection of the degassing unit with the electronics housing is realized from the exterior.

Finally, the housing wall can comprise at an outer side a sealing surface which is extending circumferentially about the pressure compensation opening against which the housing seal of the degassing unit is resting in a mounted state.

The sealing surface is preferably embodied as a region of the wall of the electronics housing with deviations as little as possible with regard to flatness and minimal roughness. In a suitable way, the electronics housing or at least its wall comprises a metal material or consists thereof so that the sealing surface, with regard to the aforementioned properties, can be obtained simply by mechanical processing.

DESCRIPTION OF PREFERRED EMBODIMENTS

Figure 1:
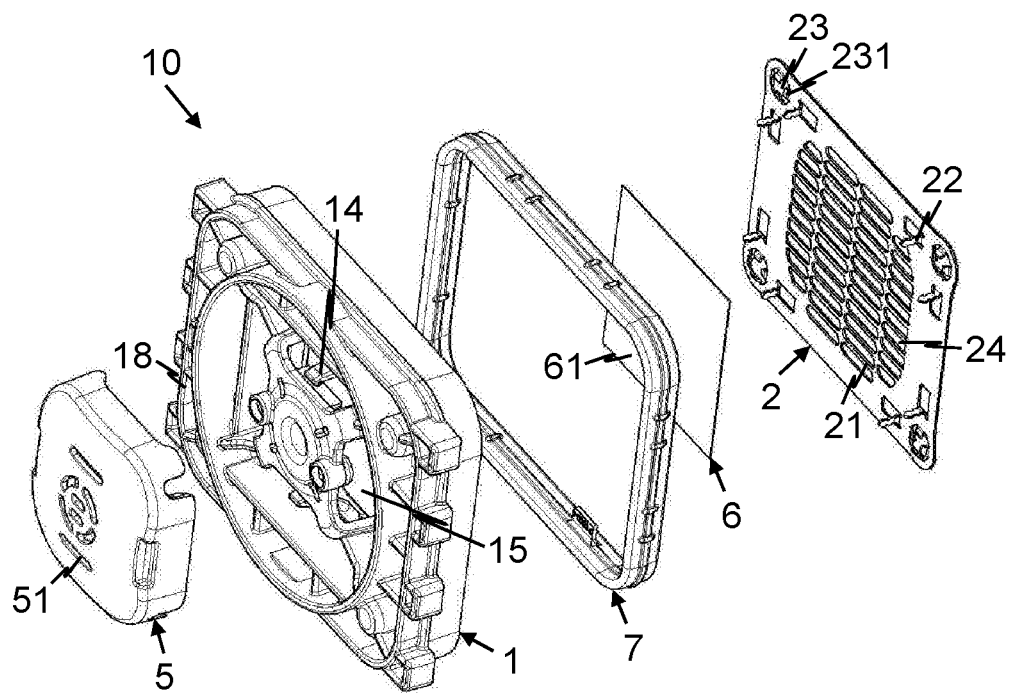
FIG. 1 shows an isometric exploded view of a degassing unit according to the invention.

In FIG. 1, the degassing unit 10 according to the invention is illustrated in an isometric exploded illustration. It comprises a base body 1 which is connectable by means of a screw connection (see FIG. 2) to a rim of a pressure compensation opening of an electronics housing, in particular of a battery housing of a traction battery. For fluid-tight sealing of the base body 1 relative to a wall of the electronics housing, a housing seal 7 is provided which is here embodied as an axially acting shaped seal. The base body has a gas passage opening 15 through which a pressure compensation between housing interior and the environment as well as vice versa can take place.

The gas passage opening 15 is covered by a fluid-permeable protective screen 2 which provides an ingress protection and prevents that voltage-conducting components in the interior of the electronics housing can be touched and/or be damaged by pointed objects. The protective screen 2 has a plurality of screen webs 21 between which a plurality of screen openings 24 are provided. The protective screen 2 in the illustrated embodiment is embodied as a stamped sheet metal part which by means of the axially projecting securing tabs 22 is fixed relative to the base body 1 in that the securing tabs 22 in an assembled state are received in corresponding securing openings 13 of the base body.

Furthermore, the degassing unit 10 comprises a semipermeable membrane 6 which is permeable for gaseous fluids but prevents passage of solid bodies and liquids. Preferably, the semipermeable membrane 6 is designed as a porous PTFE film. The semipermeable membrane 6 is connected fluid-tightly to the base body 1 about the gas passage opening 15 of the base body 1, preferably welded thereto or glued thereto, namely to the rim 151.

At its outer side 18, a cover 5 is connected to the base body 1 and comprises at least one venting opening 51 and is configured to provide a protection for the sensitive semipermeable membrane 6 so that the latter cannot be damaged from the exterior by foreign bodies, for example, pointed objects such as screwdrivers or the like, or by means of high pressure cleaners devices and/or steam cleaners. Construction and dimensioning of the cover therefore contribute significantly to a high IP rating.

Figure 2:
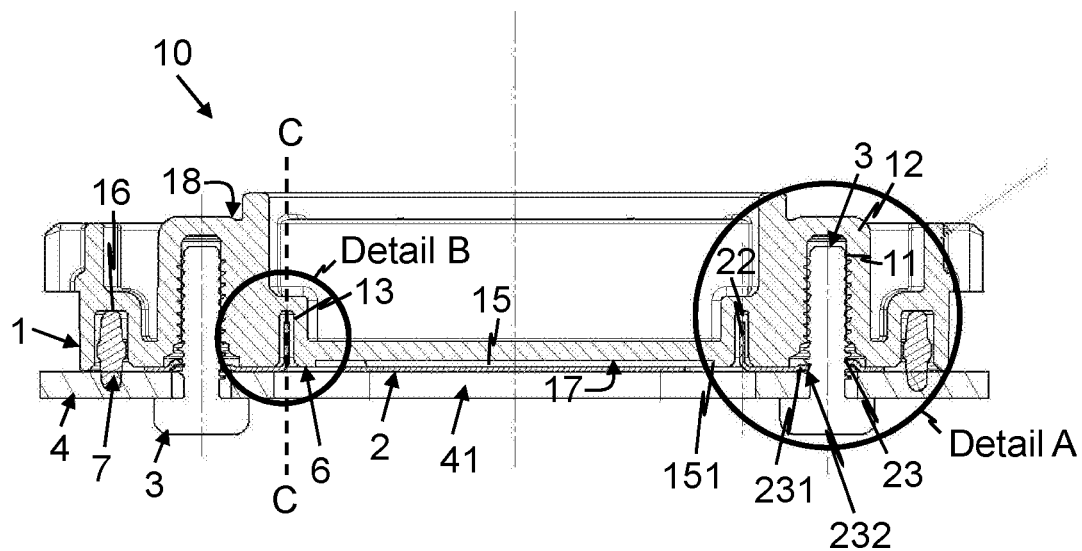
FIG. 2 shows a longitudinal section view of the degassing unit according to the invention.

In the longitudinal section view of FIG. 2, the degassing unit 10 according to the invention is now shown in an installed state. The degassing unit 10 is connected from an interior of a battery housing to a wall 4 of the battery housing by means of the threaded elements 3 (screws). For fluid-tight sealing of the base body 1 of the degassing unit 10 with the wall 4 of the battery housing, the housing seal 7 is provided which is compressed by means of the sealing pretension force which is applied by the screws 3. The housing seal 7 is arranged in a seal receiving groove 16 of the base body 1 and is secured therein by a "bulgy" cross-sectional shape so that it cannot fall out upon mounting. Moreover, in the illustration of FIG. 2, the semipermeable membrane 6 as well as its connection to the rim 151 of the gas passage opening 15 can be seen, which rim is present at the inner side 17 of the base body 1.

The Figures moreover show that the screws 3 are connected directly to the thread engagement region 11 of the base body 1 which is provided in a hollow socket-shaped projection 12 of the base body 1 essentially as a blind bore. The term "bore" is not limited herein in the narrow sense of cylindrical cutouts produced by machine-cutting but is to be understood more broadly and encompasses cutouts that are open at least at one side with a similar shape without consideration of the employed manufacturing process.

Preferably, the base body 1 is comprised of a plastic material and is in particular obtainable as an injection-molded part so that the screw connection is embodied as a direct screw connection in plastic material. In the thread engagement region 11 of the base body 1 there is not mandatorily a counter thread provided; instead, it can be advantageously provided that the screws 3 are self-tapping screws which upon first screw-in action produce their own counter thread.

The screws 3 are however not only in immediate engagement with the base body 1 but also fix the protective screen 2 directly relative to the electronics housing in that they also connect it with the wall 4. For this purpose, the protective screen 2 is provided with screw through openings 23 that are coaxial or aligned with the thread engagement regions 11 of the base body 1 and through which a shaft of the screw 3 can be passed. In the region of the screw through openings 23, there is a respective thread engagement region 232 of the protective screen 2 which, by means of at least one engagement tab 231 which projects radially into the screw through openings 23, at least partially a form-fit connection with the thread turns 31 of the screw 3 is provided in order to secure the protective screen 2 relative to the wall 4. The engagement of the screw 3 in the thread engagement region 232 of the protective screen corresponds in functionally to the principle of a sheet metal nut.

This has the decisive advantage that the protective screen 2 in a technically simple way can be connected to the battery housing and this connection in the sense of a fire protection function remains intact even after thermal impact (fire, cell defect, thermal runaway) because the screw connection of the protective screen 2 is preferably a metal-in-metal connection, i.e., even when in the worst case the plastic material of the base body 1 should be softened or melted due to the heat, the protective screen 2 remains attached independently to the battery housing so that the protective function against ingress still remains.

Figure 3:
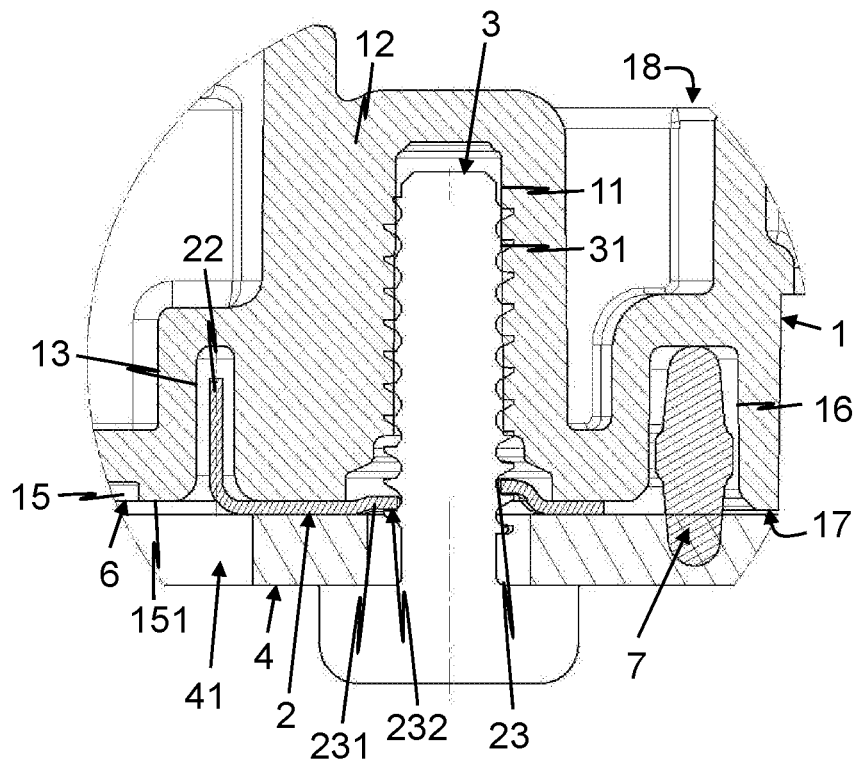
FIG. 3 shows detail A of FIG. 2.

With regard to the fixation of the protective screen 2 relative to the wall of the battery housing, reference is being had to FIG. 3 which shows the detail A according to FIG. 2 on an enlarged scale.

Figure 4:
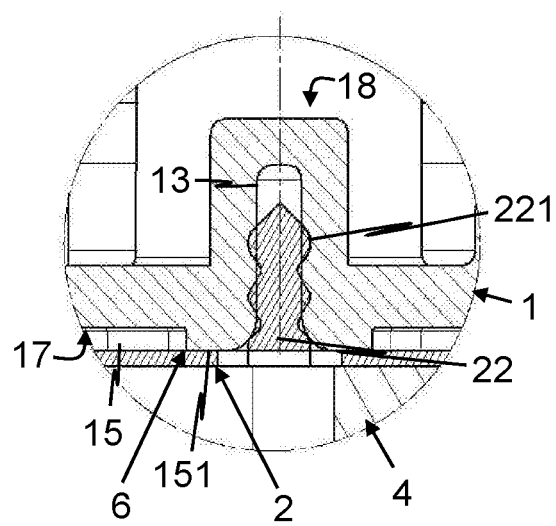
FIG. 4 shows detail B according to the longitudinal section view of FIG. 2 in a section plane C-C rotated by 90°.

Moreover, the protective screen 2 is secured relative to the base body 1 at least such that the degassing unit 10 as a component can be connected in a single-stage mounting process to the wall 4 of the battery housing. The fixation of the protective screen 2 relative to the base body 1 is realized by axially projecting securing tongues 22 of the protective screen 2 which are received in corresponding securing recesses or securing openings 13 of the base body, in particular are pressed into them with oversize. The securing openings 13 for this purpose are embodied open at the inner side 17 of the base body 1. Reference is being had in this context to FIG. 4 which illustrates the detail B according to FIG. 2 in a section plane C-C on an enlarged scale wherein the section plane C-C extends normal to the image plane. The securing tongues 22 of the protective screen 2 have across their axial length a toothing 221 by means of which they can effectively "claw" into the plastic material of the base body 1. The corresponding securing opening 13 on the part of the base body 1 is embodied closed relative to the outer side 18 of the base body 1 so that optionally chips or abraded particles produced upon pressing in the securing tongues 22 are safely retained and thus specifications with regard to cleanness are not impaired. In embodiments which are not illustrated, the fixation of the protective screen 2 relative to the base body 1 can also be realized in an alternative way, for example, by gluing, welding, screwing, clipping and/or riveting.

Figure 5:
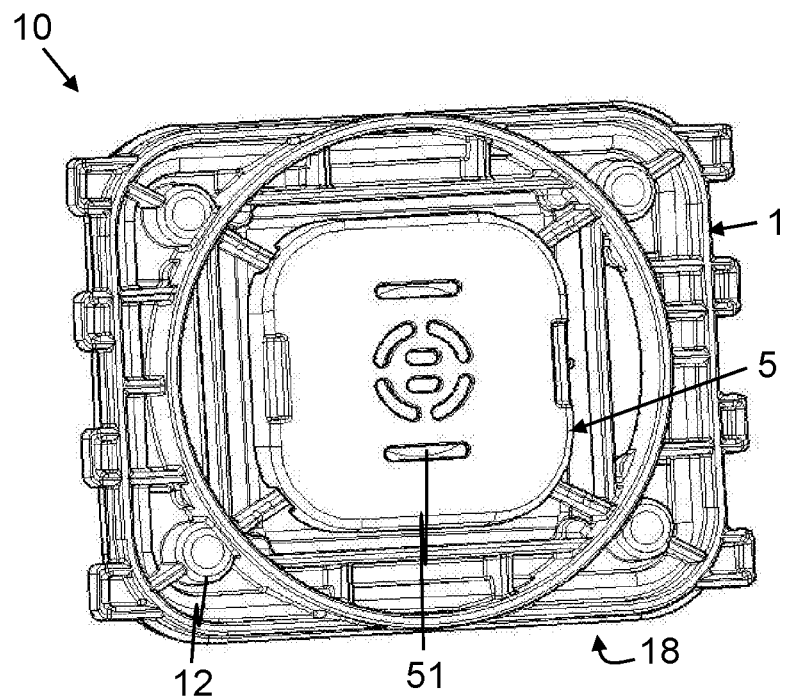
FIG. 5 shows an isometric view of the degassing unit according to the invention from the exterior side.
Figure 6:
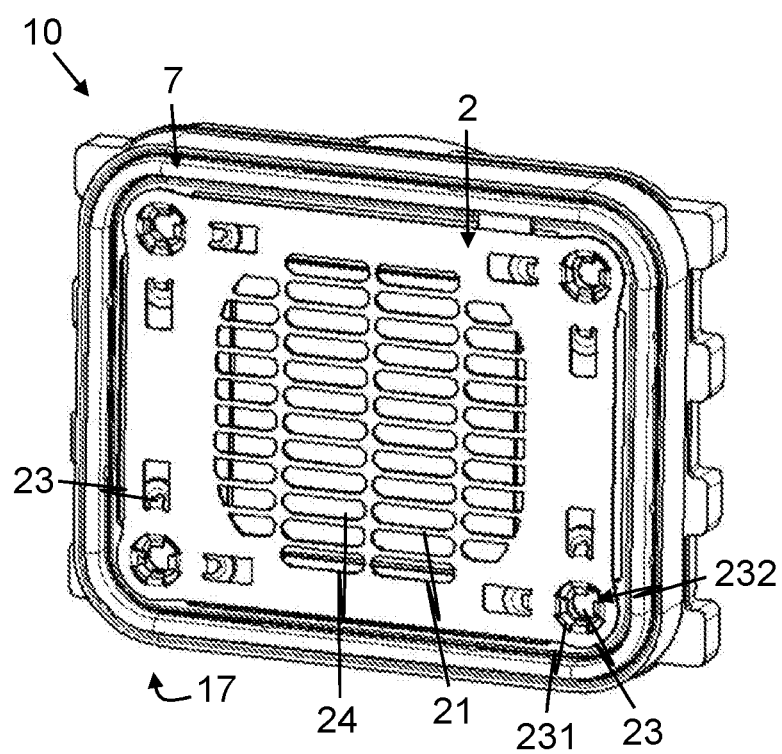
FIG. 6 shows an isometric view of the degassing unit according to the invention from the inner side.

In FIG. 5 and FIG. 6, the degassing unit 10 according to the invention is shown finally in an assembled state. FIG. 5 shows in this context the degassing unit 10 from the outer side 18 while FIG. 6 shows it from the inner side 17.

Figure 7:
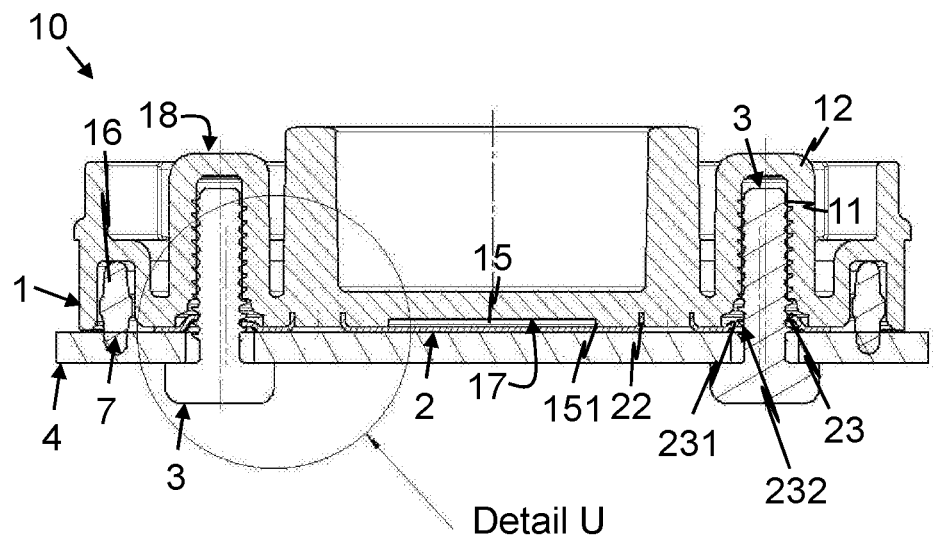
FIG. 7 shows a longitudinal section view of a further embodiment of the degassing unit according to the invention with connecting bulge at the support screen.
Figure 8:
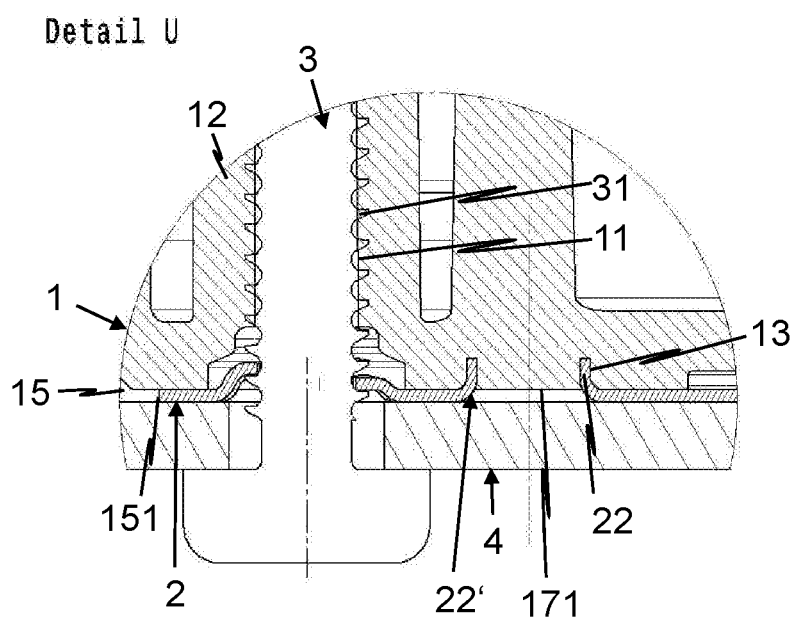
FIG. 8 shows detail U of FIG. 7.
Figure 9:
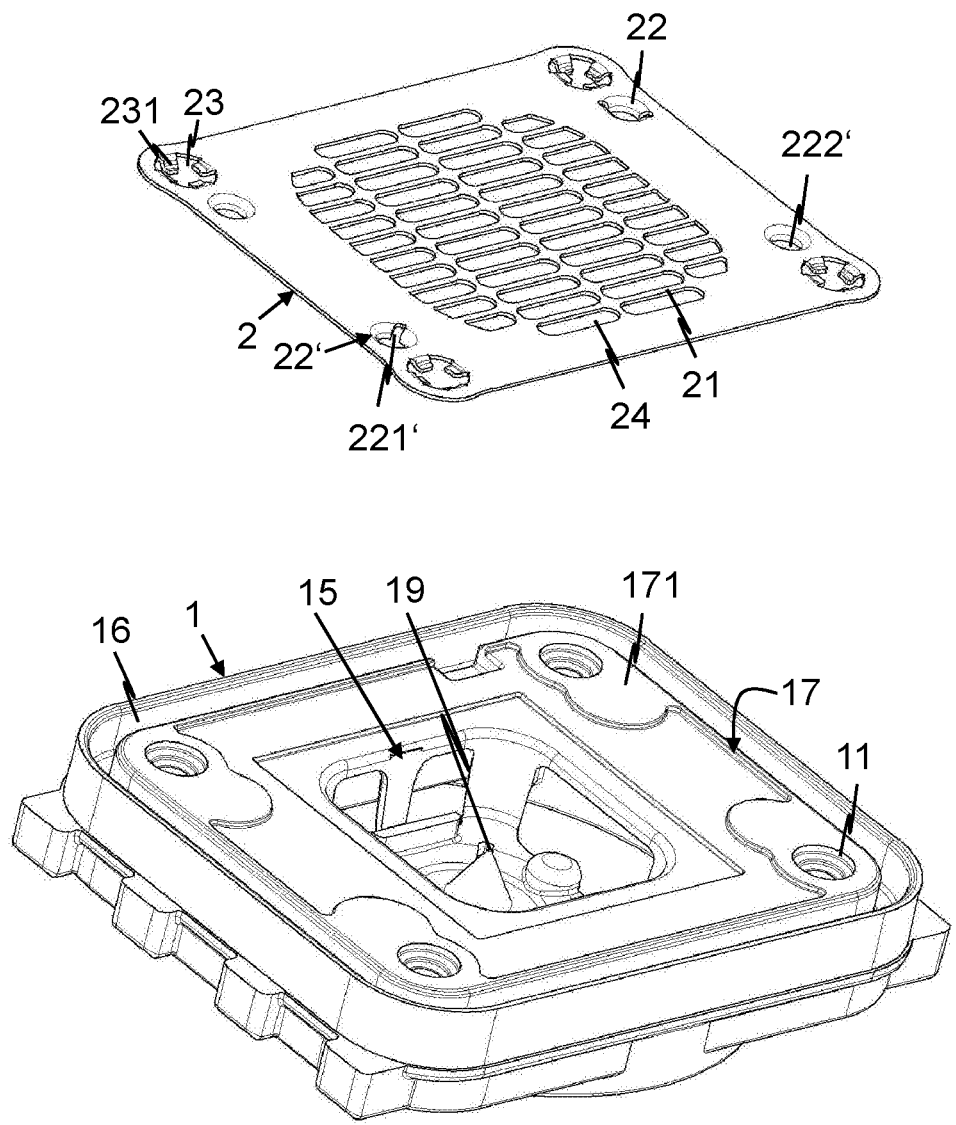
FIG. 9 shows an isometric exploded view of the degassing unit according to FIG. 7 with removed semipermeable membrane.

FIG. 7 to FIG. 9 show finally a further embodiment of the degassing unit 10 according to the invention. Functionally, it corresponds substantially to the afore described variant. The difference resides in the connection of the protective screen 2 to the base body 1 which is realized in a particularly cost-optimized and process-optimized way according to this embodiment. The protective screen 2, as in the afore described embodiments, is attached also at an inner side 17 of the base body 1. For attachment, at the protective screen 2 a plurality of spherical cap-shaped or cupola-shaped bulges 22' are provided which each form at least one securing tongue 22 which is pressed into a corresponding securing opening 13 of the base body 1. The securing opening 13 according to this embodiment, in which the securing tongues 22 are pressed into the base body material, are produced only once the pressing action is performed, i.e., the pressing action is realized in particular in an opening-free section of the base body 1. The bulge 22' bulges in a direction facing the inner side 17 of the base body 1, i.e., relative to a preferred mounting state of the degassing unit 10 in a direction which is facing away from the electronics housing or its wall 4.

The tongues 22 which are formed by the bulge 22' are pressed into the base body material; this can be done in particular at room temperature or with thermal action. In particular, this can be done by hot stamping the bulges 22' on a surface of the base body 1. In a contact region with the bulges 22', the base body 1 has particularly preferred a flat surface 171 which is illustrated in FIG. 9.

The bulges 22' have a predetermined diameter and can be provided, distributed about their circumference, with at least one slot 221' by means of which the securing tongue 22 is formed. It is also possible to have two, three, four or even more slots 221' whereby the transmittable securing forces can be increased. Moreover, the bulge 22' has a central through opening 222' which enables the entry of base body material upon pressing; when thermal action is used, softened or melted material can pass through the through openings 222'. In addition, the through opening 222' provides the required deformability of the protective screen material (preferably sheet-metal, in particular sheet steel) for producing the tongues 22 by means of deep-drawing.

Advantageously, for producing the bulges 22' a simple deep-drawing method by the use of a deep-drawing plunger can be used. The through opening 222' and the slots 221' can be produced prior to deep drawing, subsequent thereto but also at the same time by stamping. This type of manufacture has significant advantages with regard to processing time and costs compared to comparable methods such as laser cutting.

Moreover, it is advantageous that the tongues 22 according to this embodiment must not be inserted in a complex way into pre-manufactured securing openings of the base body 1 but the tongues 22, optionally with thermal action, produce their securing openings on their own by being pressed in. This facilitates the manufacture additionally because less stringent specifications in regard to the positioning precision in the plane are required.

In the isometric exploded view of FIG. 9, an emergency degassing spike 19 of the base body 1 is moreover illustrated. It extends toward the semipermeable membrane (not illustrated) and in the rest state (no differential pressure load) is arranged at a predetermined spacing relative to the membrane surface. Under pressure load (relative excess pressure in the interior), the semipermeable membrane will bulge in the direction of the exterior space and upon reaching a limit pressure will contact the tip of the emergency degassing spike 19. Due to its pointed end, the emergency degassing spike 19 then produces a targeted weakening of the semipermeable membrane so that it ruptures. This serves for securing an emergency degassing function that reacts as quickly as possible which is important in order to ensure that the housing structure remains intact upon a sudden inner pressure increase in the electronics housing. By a variation of the spacing of the tip of the emergency degassing spike 19 from the membrane surface, the emergency degassing pressure is adjustable.

LIST OF REFERENCE CHARACTERS 10 degassing unit
1 base body
11 thread engagement region of the base body
12 hollow socket-shaped projection of the base body
13 securing opening of the base body for engagement of the securing tongues of the protective screen
14 fastening means for cover
15 gas passage opening
151 rim of the gas passage opening
16 seal receiving groove of the base body
17 inner side of the base body
171 flat contact surface
18 outer side of the base body
19 emergency degassing spike
2 protective screen
21 screen webs
22 securing tongues of the protective screen
22' bulge of the protective screen
221' slot of the bulge 222' through opening of the bulge
221 toothing of the securing tongues of the protective screen
23 screw through opening of the protective screen
232 thread engagement region of the protective screen
231 engagement tabs of the thread engagement region of the protective screen
24 screen openings
3 threaded element/screw
31 thread turn
4 wall of the electronics housing
41 through bore of the wall of the electronics housing
5 cover
51 venting openings
6 semipermeable membrane
61 outer membrane surface
7 housing seal

What is claimed is:

1. A degassing unit for an electronics housing, the degassing unit comprising:
a base body configured to be connected fluid-tightly to a rim of a pressure compensation opening of the electronics housing, the base body comprising at least one gas passage opening;
a semipermeable membrane covering the at least one gas passage opening, wherein the semipermeable membrane enables passage of gaseous media from an environment into the electronics housing and from the electronics housing to the environment, but prevents passage of liquid media and solids;
a protective screen configured to be fluid-permeable and comprising a plurality of screen openings, wherein the protective screen is arranged at an inner side of the base body and at least partially engages across the at least one gas passage opening;
wherein the base body comprises a thread engagement region configured to screw-connect the degassing unit to the electronics housing;
wherein the protective screen comprises a screw through opening substantially aligned with the thread engagement region of the base body;
wherein, in a region of the screw through opening of the protective screen, a thread engagement region of the protective screen is provided that is configured to fix the protective screen by a threaded fastening element immediately relative to the electronics housing in a mounted state of the degassing unit at the electronics housing.

2. The degassing unit according to claim 1, wherein the semipermeable membrane is disposed at the inner side of the base body and is engaged at least partially from behind by the protective screen.

3. The degassing unit according to claim 1, wherein the thread engagement region of the base body comprises a bore that is open toward the inner side of the base body and is configured to receive the threaded fastening element from the inner side of the base body.

4. The degassing unit according to claim 3, wherein the bore is a blind bore.

5. The degassing unit according to claim 1, wherein the at least one thread engagement region of the base body is configured to be free of metal.

6. The degassing unit according to claim 1, wherein the protective screen is a sheet metal part.

7. The degassing unit according to claim 6, wherein the thread engagement region of the protective screen is embodied as one piece together with the protective screen.

8. The degassing unit according to claim 7, wherein the thread engagement region of the protective screen is an engagement section projecting radially into the screw through opening of the protective screen and comprising at least one engagement tab configured to produce, in the mounted state of the degassing unit at the electronics housing, a form-fit contact with the threaded fastening element.

9. The degassing unit according to claim 1, wherein the protective screen is at least fixed relative to the base body.

10. The degassing unit according to claim 9, wherein the protective screen comprises a securing tongue projecting in a direction toward the base body and received in a corresponding securing opening of the base body so that the protective screen is fixed relative to the base body.

11. The degassing unit according to claim 10, wherein the securing tongue is pressed into the corresponding securing opening and/or thermally connected to the corresponding securing opening.

12. The degassing unit according to claim 10, wherein the securing tongue comprises a toothing.

13. The degassing unit according to claim 10, wherein the securing tongue is a part of a bulge provided at the protective screen and comprising a predetermined diameter.

14. The degassing unit according to claim 13, wherein the bulge comprises substantially a shape of a spherical cap or of a cupola, wherein the securing tongue is at least partially formed by a slot in the bulge, wherein the bulge comprises a central through opening.

15. The degassing unit according to claim 1, wherein a plurality of said thread engagement region of the base body are provided and surround the at least one gas passage opening and wherein, correspondingly, a plurality of said screw through opening and a plurality of said thread engagement region of the protective screen are provided.

16. The degassing unit according to claim 15, wherein said plurality of said thread engagement region of the base body, said plurality of said screw through opening, and said plurality of said thread engagement region of the protective screen are arranged in regular angular spacings relative to each other, respectively.

17. The degassing unit according to claim 1, wherein the semipermeable membrane is connected circumferentially to a rim of the at least one gas passage opening of the base body.

18. The degassing unit according to claim 17, wherein the semipermeable membrane is connected circumferentially to the rim of the at least one gas passage opening of the base body by welding.

19. The degassing unit according to claim 1, further comprising a cover connected to the base body, wherein the cover comprises at least one venting opening.

20. The degassing unit according to claim 19, wherein the cover is fastened by a locking element to the base body.

21. The degassing unit according to claim 1, further comprising a housing seal surrounding circumferentially the at least one gas passage opening of the base body at the inner side.

22. An electronics housing comprising at least one housing wall with a pressure compensation opening, wherein the pressure compensation opening is closed by a degassing unit according to claim 1.

23. The electronics housing according to claim 22, wherein the degassing unit is connected from an interior space of the electronics housing by a threaded fastening element to the at least one housing wall, wherein the threaded fastening element engages directly the thread engagement region of the protective screen.

24. The electronics housing according to claim 22, wherein the at least one housing wall comprises at an outer side a sealing surface circumferentially extending about the pressure compensation opening, wherein the degassing unit comprises a housing seal surrounding circumferentially the at least one gas passage opening of the base body at the inner side, wherein the housing seal is resting against the sealing surface in the mounted state of the degassing unit at the electronics housing.

25. The electronics housing according to claim 22, wherein the electronics housing is a battery housing.

26. The electronics housing according to claim 22, wherein the threaded fastening element is a self-tapping screw.

\* \* \* \* \*